United States Patent
Huang et al.

(10) Patent No.: US 8,186,433 B2
(45) Date of Patent: May 29, 2012

(54) METHODS OF GRAVEL PACKING LONG INTERVAL WELLS

(75) Inventors: Tianping Huang, Spring, TX (US); James B. Crews, Willis, TX (US); Allen D. Gabrysch, Houston, TX (US); Brian A. Evans, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 272 days.

(21) Appl. No.: 12/537,872

(22) Filed: Aug. 7, 2009

(65) Prior Publication Data

US 2011/0030952 A1 Feb. 10, 2011

(51) Int. Cl.
*E21B 43/04* (2006.01)
*E21B 43/26* (2006.01)

(52) U.S. Cl. .................................. 166/278; 166/305.1
(58) Field of Classification Search .................. None
See application file for complete search history.

(56) References Cited

U.S. PATENT DOCUMENTS

| | | | |
|---|---|---|---|
| 5,058,677 A | 10/1991 | Forrest | |
| 5,964,295 A | 10/1999 | Brown et al. | |
| 5,979,557 A * | 11/1999 | Card et al. | 166/300 |
| 5,979,755 A | 11/1999 | Chaya | |
| 6,239,183 B1 | 5/2001 | Farmer et al. | |
| 6,435,277 B1 * | 8/2002 | Qu et al. | 166/281 |
| 6,482,866 B1 * | 11/2002 | Dahayanake et al. | 516/77 |
| 6,631,764 B2 | 10/2003 | Parlar et al. | |
| 6,883,608 B2 * | 4/2005 | Parlar et al. | 166/278 |
| 7,052,901 B2 * | 5/2006 | Crews | 435/281 |
| 7,081,439 B2 | 7/2006 | Sullivan et al. | |
| 7,343,972 B2 | 3/2008 | Willingham et al. | |
| 7,527,103 B2 | 5/2009 | Huang et al. | |
| 7,550,413 B2 | 6/2009 | Huang et al. | |
| 7,723,272 B2 | 5/2010 | Crews et al. | |
| 2002/0169085 A1 | 11/2002 | Miller et al. | |
| 2003/0234103 A1 | 12/2003 | Lee et al. | |
| 2004/0084181 A1 * | 5/2004 | Wood et al. | 166/278 |
| 2005/0028978 A1 * | 2/2005 | Parlar et al. | 166/278 |
| 2006/0041028 A1 | 2/2006 | Crews | |
| 2006/0211775 A1 | 9/2006 | Crews | |
| 2006/0211776 A1 | 9/2006 | Crews | |
| 2007/0151726 A1 * | 7/2007 | Crews et al. | 166/246 |
| 2007/0244015 A1 | 10/2007 | Crews et al. | |
| 2007/0298978 A1 * | 12/2007 | Crews et al. | 507/265 |
| 2007/0299142 A1 * | 12/2007 | Crews et al. | 516/135 |
| 2008/0060812 A1 | 3/2008 | Huang et al. | |
| 2008/0103070 A1 | 5/2008 | Welton | |
| 2008/0202744 A1 | 8/2008 | Crews et al. | |
| 2008/0271888 A1 * | 11/2008 | Huang et al. | 166/279 |

FOREIGN PATENT DOCUMENTS

EP 1617039 A1 1/2006

* cited by examiner

*Primary Examiner* — Angela M DiTrani
*Assistant Examiner* — Silvana Sunyan
(74) *Attorney, Agent, or Firm* — Mossman Kumar & Tyler PC

(57) ABSTRACT

Changing concentrations of brine in a gravel pack carrier fluid gelled with a viscoelastic surfactant (VES) increases the fluid efficiency for gravel packing long interval wells, such as wellbore producing interval greater than about 100 feet (about 30 m). VES-gelled fluids used as gravel packing fluids herein also include surfactants, fluid loss control agents, internal breakers and brine in addition to the grave. The viscoelasticity of fluid system can suspend and deliver high concentration of the gravels while reducing carrier fluid volume.

20 Claims, 2 Drawing Sheets

Leakoff test results at 200°F (93°C) and 1000psi (6.9 MPa) with 400md ceramic discs
Base: 4%WG-3L + 7gptg Fluid Loss Control Agent + Internal Breaker

METHODS OF GRAVEL PACKING LONG INTERVAL WELLS

TECHNICAL FIELD

The present invention relates to methods of gravel packing long interval wellbores in subterranean formations during hydrocarbon recovery operations, and more particularly relates, in one non-limiting embodiment, to methods of gravel packing long interval wellbores using aqueous fluids gelled with viscoelastic surfactants, which fluids are sufficiently viscous to suspend the gravel.

TECHNICAL BACKGROUND

The process of gravel packing to restrict and control the passage of particulate materials from a subterranean formation well which penetrates the formation to facilitate the recovery of hydrocarbons is well known. This sand-control method is used to prevent the production of formation sand. In gravel pack operations, a steel screen is typically placed in the wellbore and the surrounding annulus is packed with prepared gravel of a specific size designed to prevent the passage of formation sand. The primary objective is to stabilize the formation while causing minimal impairment to well productivity.

However, horizontal wells present a special, often problematic case for gravel packing and few horizontal wells have been completed in unconsolidated formations. Most operators have completed their horizontal wells in consolidated formations using slotted liners to provide borehole stability and a limited amount of sand control. Pre-packed screens have been successfully used in open-hole horizontal well completions in a friable sandstone. Gravel packing, the industry's more conventional sand control method for vertical and deviated wells, has been applied in horizontal wells.

Previous work showed that low-viscosity carrier fluids such as water could completely pack short horizontal model wells, but there are potential draw-backs for field applications. They may require the use of low gravel concentrations, longer placement times, and larger carrier fluid volumes. In permeable formations, excessive fluid loss can occur, damaging the formation. Gravel settling in the tubing during pumping is another concern.

It would thus be desirable to discover a method which could provide a method for gravel packing generally horizontal wells in permeable formations using conventional gravel concentrations, conventional placement times and lower carrier fluid volumes, while minimizing fluid loss and formation damage.

SUMMARY

There is provided in one non-restrictive version, a method of gravel packing an interval in a wellbore that involves drilling a wellbore into a subterranean formation to create an interval in the formation and introduce a pipe into the wellbore adjacent the interval, where an annulus is present between the pipe and a wellbore wall. A first gravel pack carrier fluid is introduced into a first section of the annulus, where the first gravel pack carrier fluid includes water having a first salt concentration, at least one viscoelastic surfactant (VES) in an amount effective to increase the viscosity of the water, at least one internal breaker, at least one fluid loss control agent, and gravel. A second gravel pack carrier fluid is introduced into a second section of the annulus adjacent and proximate to the first section of the annulus (typically subsequent to introducing the first gravel pack carrier fluid), where the second gravel pack carrier fluid is identical to the first gravel pack carrier fluid except that it has a second salt concentration different from the first salt concentration. The gravel is thus placed in the intervals. It is expected that the gravel is placed or substantially fills the intervals relatively uniformly and/or homogeneously.

There is also provided, in another non-limiting form, a method of gravel packing an interval in a wellbore that includes drilling a wellbore into a subterranean formation to create a generally horizontal interval in the formation, where the interval comprises a heel and a toe. A pipe is introduced into the wellbore adjacent the interval, where an annulus is created between the pipe and a wellbore wall. A first gravel pack carrier fluid is introduced into a first section of the annulus. The first gravel pack carrier fluid includes water having a first salt concentration, at least one VES in an amount effective to increase the viscosity of the water, at least one internal breaker, at least one fluid loss control agent, and gravel. A second gravel pack carrier fluid is introduced into a second section of the annulus adjacent and proximate the first section of the annulus. The second gravel pack carrier fluid is identical to the first gravel pack carrier fluid except that it has a second salt concentration different from the first salt concentration. In one non-limiting embodiment, the first section of the annulus is adjacent the heel, and the first salt concentration is greater than the second salt concentration. In an alternate, non-restrictive embodiment, the first section of the annulus is adjacent the toe, and where the first salt concentration is greater than the second salt concentration. The gravel is thus placed in the intervals in a sequence of steps or operations.

Alternatively there is provided in one non-restrictive embodiment a method of gravel packing a horizontal interval in a wellbore that involves drilling a wellbore into a subterranean formation to create a horizontal interval in the formation, where the interval comprises a heel and a toe. A pipe is introduced into the wellbore adjacent the interval, where an annulus is formed between the pipe and a wellbore wall. A first gravel pack carrier fluid is introduced into a first section of the annulus. The first gravel pack carrier fluid contains water having a first salt concentration, at least one VES in an amount effective to increase the viscosity of the water, at least one internal breaker, at least one fluid loss control agent and gravel. A second gravel pack carrier fluid is introduced into a second section of the annulus adjacent the first section of the annulus. The second gravel pack carrier fluid is identical to the first gravel pack carrier fluid except that it has a second salt concentration different from the first salt concentration. A third gravel pack carrier fluid is introduced into a third section of the annulus adjacent and proximate to the second section of the annulus and distal to the first section of the annulus. The third gravel pack carrier fluid is identical to the first and second gravel pack carrier fluids except that it has a third salt concentration different from the first salt concentration and the second salt concentration in a graduated sequence. In one non-limiting embodiment the graduated sequence involves the first salt concentration being greater than the second salt concentration which is in turn greater than the third salt concentration. In an alternative, non-restrictive version, the graduated sequence involves the third salt concentration being less than the second salt concentration which is in turn less than the first salt concentration.

Figure 2:
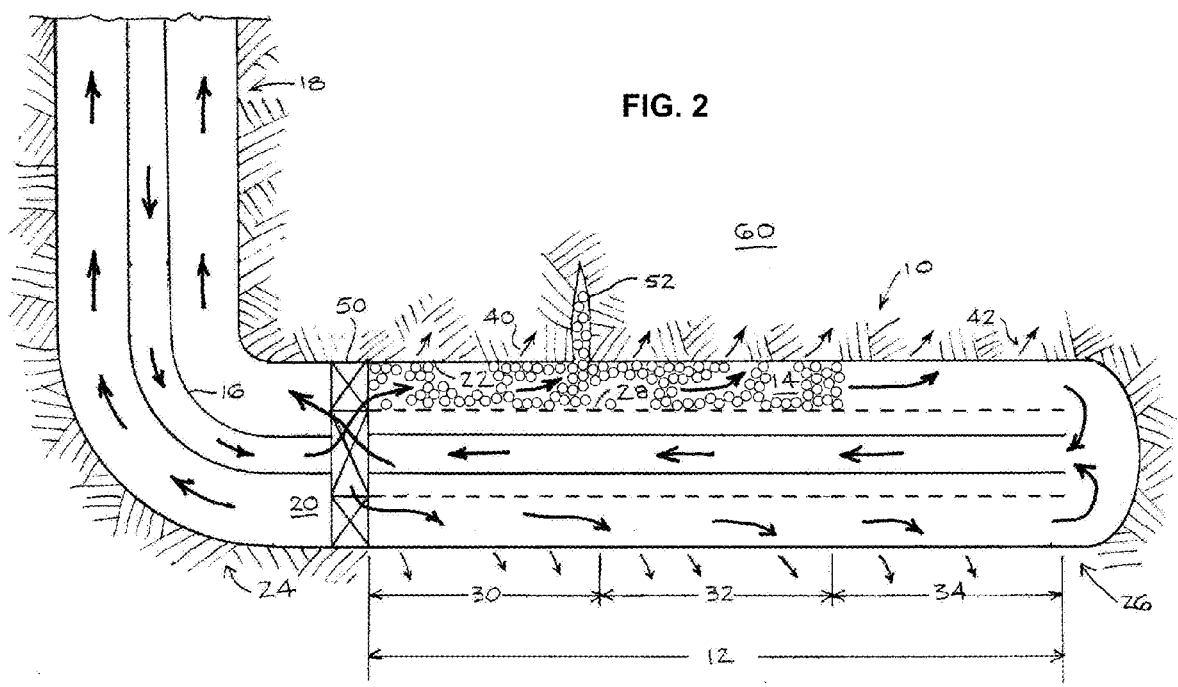
FIG. 2 is a schematic diagram of a long interval in a horizontal wellbore illustrating the placement of a gravel pack using multiple gravel pack carrier fluids.

It will be appreciated that FIG. 2 is not to scale or proportion and that certain features are exaggerated for emphasis, and further that this lack of correct scale and proportion does not limit the methods and structures described herein.

DETAILED DESCRIPTION

Figure 1:
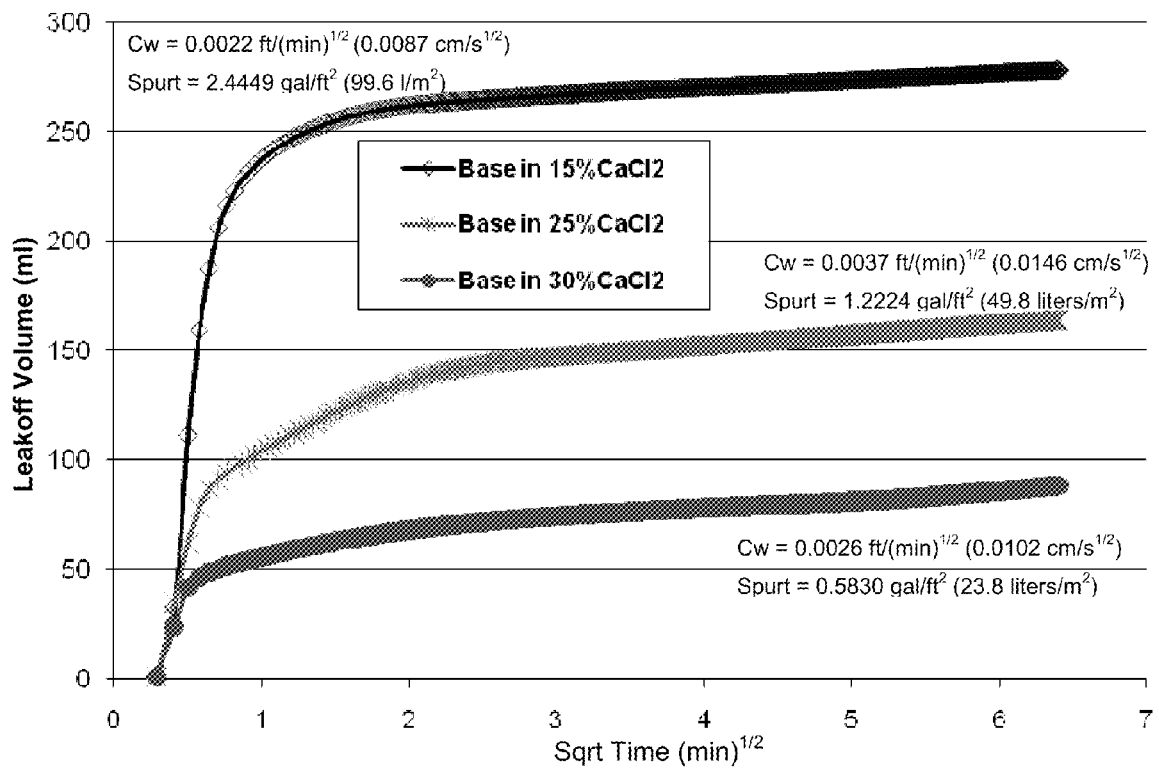
FIG. 1 is a graph of leakoff test results showing leakoff volume as a function of square root of time for three different brine concentrations for a base fluid having 4% WG-3L VES, 7 gptg fluid loss control agent and an internal breaker conducted with 400 millidarcy (md) ceramic discs at 200° F. (93° C.) and 1000 psi (6.9 MPa)

It has been discovered that changing concentrations of brine in VES fluids increases the fluid efficiency for gravel packing long interval wells, such as wellbore producing interval greater than about 100 feet (about 30 m). Fluids gelled with viscoelastic surfactants used as gravel packing fluids in this method include the VES, at least one fluid loss control agent, at least one internal breaker, brine and, of course, the gravel. The viscoelasticity of the fluid system can suspend and deliver high concentrations of gravel. Fluid leakoff properties can be used to increase fluid efficiency for gravel packing in perforation tunnels and open hole for long interval wellbores. Laboratory fluid leakoff tests discussed below show that changing only the brine concentration in the VES fluid formulation can significantly change spurt loss of the fluid system, which can be applied to optimize fluid volume for the gravel packing operations. All other components and proportions may remain the same. That is, under the same conditions (fluid loss control agent loading, surfactant concentration, internal breaker loading), the VES-gelled gravel pack carrier fluid with higher brine concentration has higher fluid loss control from test results, as shown in FIG. 1, discussed below. This process will generate a uniformly distributed gravel pack with much less volume of fluid. After the gravel packing operation, the internal breakers in VES fluid will break down the filter cake on the wall of the wellbore and the fluid viscosity is significantly reduced. Because the viscosity is generated by viscoelastic surfactants rather than the more conventional polymers, little formation damage will be generated that will interfere with subsequent production.

FIG. 1 is a graph of leakoff test results showing leakoff volume as a function of square root of time for three different brine concentrations for a base fluid having 4% WG-3L VES, 7 gptg fluid loss control agent and an internal breaker conducted with 400 md ceramic discs at 200° F. (93° C.) and 1000 psi (6.9 MPa). The Cw and spurt are given for each of the three fluids. It may be seen that as the salt concentration (brine) decreases, the leakoff volume increases.

Shown in FIG. 2 is a schematic diagram of subterranean formation 60 having therein a generally horizontal wellbore 10 with a long interval 12 in illustrating the placement of a gravel pack 14 using multiple gravel pack carrier fluids. It will be appreciated that only part of the annulus 20 is shown filled with gravel or sand in FIG. 2 and that the size of the gravel particles shown is greatly exaggerated for effect. By "generally horizontal" is meant from about 70° to about 110° from vertical. In an alternative, non-restrictive definition, "generally horizontal" may be defined as from about 80° to about 100° from vertical] In the interval 12, pipe 16 is located at least approximately centrally in horizontal wellbore 10 (as well as in generally vertical portion 18 of the wellbore). An annulus 20 is present between the pipe 16 and the wellbore wall 22. Interval 12 has a heel portion 24 and a toe portion 26. Pipe 16 may be surrounded by a screen 28, which may be a conventional screen as known in the art. Producing interval 12 in the horizontal wellbore 10 may be separated from the relatively more vertical portion of the wellbore 18 by a packer and crossover 50. Fluid flow is shown by the relatively larger, bold arrows, whereas leakoff into the formation 60 is shown by the relatively smaller arrows such as 40 and 42.

In one non-limiting example of the method herein, a first VES-gelled fluid of 30 wt % $CaCl_2$ (brine) is pumped at first section 30 of the interval 12 because of low fluid leakoff 40, which tends to cause less gravel pack at the wall 22 of the wellbore 10 and more annulus space 20 (between the packed gravel and liner (screen 28)) for following the VES gravel slurry flowing to next stage. Next, a second VES-gelled gravel pack carrier fluid of a salt concentration less than that of the first fluid, e.g. 25 wt % $CaCl_2$ is then used for a second section 32 of the interval 12 and similarly a third VES-gelled fluid of a second salt concentration, in a non-limiting example, of 15 wt % $CaCl_2$ for a last section 34 of interval 12. The higher spurt loss of the VES fluid in 15 wt % $CaCl_2$ introduces more of a gravel pack at the wall 22 of wellbore 10. The first section 30 with the VES in 30 wt % $CaCl_2$ has the lowest leakoff 40 at the beginning of the method, but experiences the longest gravel packing time. The last section 34 with VES at 15 wt % $CaCl_2$ concentration has highest leakoff 42 but experiences the shortest gravel packing time.

In the illustration of FIG. 2 and its description above, the highest brine concentration, i.e. first gravel pack carrier fluid, is pumped in first, where the first section 30 of the interval 12 is adjacent the heel 24. However, it will be appreciated that the method may be practiced in an alternative way, where the first section 30 is adjacent the toe, but in this case the salt concentration is less than for the second (middle section) 32, and the fluid used in third and last section 34 has the greatest salt concentration, for the section nearest the heel 24. In other words, the placement sequence is reversed. In some cases, shunt tubes (not shown) may be used in the placement of the gravel pack 14 in one or more of these embodiments.

It will also be appreciated that there is nothing particularly limiting or special about using three VES-gelled gravel pack carrier fluids where the only variation is in the salt concentration. Two such fluids may be used (as are described elsewhere herein), but four, five or more such fluids may be used as well. It is expected that in most cases the concentrations will decrease or increase in the sequence described. Further, it is not necessary that the salt concentrations be 30 wt %, 25 wt % or 15 wt % as noted. These are simply non-limiting illustrative values. Certainly other concentrations and sequences may be used. Additionally, it will be understood that sections 30, 32 and 34 need not be of equal length as shown in FIG. 2, although they may be.

In another non-limiting embodiment, the interval 12 may have perforation tunnels or perforations 52 (only one is schematically shown in FIG. 2 although in most cases there will be many), which will also be packed with gravel according to the methods herein. When perforation tunnels 52 are present, they are in series along the length of the interval 12. Packing perforation tunnels 52 is similar to packing the annulus 20. When fluid carrying gravel is flowed to the formation 60 through the perforation tunnels 52 from the wellbore 10, the gravel is packed in the tunnels 52 and fluid 40 leaked off into the formation 60. The packing fluid should have some fluid loss; if there is no fluid loss whatsoever, the perforation tunnels could not be packed by gravel 14. The VES-gelled fluid systems of the present method show higher spurt before VES pseudo-filter cake buildup than similar polymer-based fluid systems.

Also, the method is not particularly limited to gravel packing horizontal intervals and may be used for vertical wellbores 18. However, usually vertical intervals are much shorter than horizontal intervals, and with relatively shorter interval gravel packing, the method may not show noticeably higher efficiency than regular gravel packing fluid systems.

Many gelled fluids used as carrier fluids for gravel packing treatments use crosslinked polymer fluid systems. These systems control fluid leak-off and carry gravel well, but they leave polymer accumulation on the formation face (i.e. filter cake) which may impairs both the formation-face permeability and the gravel pack conductivity. The concentration of the breaker to break long polysaccharide chain in crosslinked polymer fluid systems is based on homogeneous media (i.e. a breaker that is distributed throughout the fluid within the confined lab test container). In the gravel packed annulus, some of the breaker may be leaked off with the filtrate into the formation matrix and may leave behind dehydrated polymer unbroken, and the conductivity of the formation may be remarkably damaged.

Viscoelastic surfactant (VES) based fluid systems have been used for gelling aqueous fluids in hydrocarbon recovery operations for over a decade. VES fluids are composed of low molecular weight surfactants that form elongated micelle structures which exhibit viscoelastic behavior to increase fluid viscosity. The compositions of the VES gravel packing fluids herein is a synergistic combination of internal breakers with one or more high temperature optional stabilizers, optional viscosity enhancers, fluid loss control agents, and mix water brines up to 14.4 ppg salinity (1.7 kg/liter), e.g. $CaBr_2$. The internal breakers described herein surprisingly work in the presence of several types of VES micelle stabilizers, micelle viscosity enhancers, micelle fluid loss control agents, a wide range of mix water salinity (including divalent ions like calcium and magnesium) for fluid temperature applications ranging from about 80° F. to about 300° F. (about 27 to about 149° C.). The ability of these agents to work together by compatible mechanisms is remarkably unique and allows the many enhanced VES fluid performance properties to be combined.

The fluid loss control agents herein are those that produce a novel "pseudo-filter cake", that is, a highly viscous layer of VES fluid composed of unique particles associating with VES micelles on the core and formation faces. The ability to generate "pseudo-filter cake" will significantly reduce the rate of VES fluid leak-off, similar to the polymeric-type filter cakes but through the use of completely different mechanisms than conventional polymer filter cakes. The pseudo-filter cake has leak-off control performance similar to or analogous to polymeric-type filter cake, yet the clean-up of the pseudo-filter cake is far superior to that of conventional polymeric filter cake. In polymer filter cake, most of breaker in the polymer fluid system is leaked-off into the formation matrix and leaves a high concentration of polymer in the cake. The breaker is not attached to or connected with the polymer. In VES pseudo-filter cake, the internal breaker appears to be contained or resident inside of VES micelles and thus goes wherever VES micelles go, in one non-limiting explanation. The fluid loss control agents may work from about 80° F. to about 300° F. (about 27 to about 149° C.). A wide range of particle types and properties have been found of utility to improve the performance of the VES fluid, which includes, but is not necessarily limited to, surface adsorption, crystal surface charges, piezoelectric and pyroelectric particles, and nanosized particle properties and technology. Additionally, the synergistic use of internal breakers with the pseudo-filter cake has been discovered to allow the pseudo-filter cake to be readily degraded into an easily producible broken VES fluid. Another improved performance feature is how the fluids herein, a portion of which may inevitably leak-off into the pores of the reservoir during a treatment, can carry with it internal breaker that converts the VES fluid into an easily producible fluid without the need for contacting reservoir hydrocarbons.

A viscoelastic surfactant-internal breaker aqueous fluid system containing viscosity enhancers, VES stabilizers for high temperature, and fluid loss control agents and methods for using the systems for placing gravel adjacent subterranean formations penetrated by a well bore have been discovered. A viscous gel starts to develop when the viscoelastic surfactant (VES) is mixed with an aqueous base fluid. A salt or other counterion may be used in the aqueous fluid containing VES to help promote viscous micelle formation. The VES-based gravel pack carrier fluid is pumped in one or more sequential stages. The stages of viscoelastic surfactant gelled fluid (that contains the mineral oil and/or fish oil, transition metal ion source, saponified fatty acid, unsaturated or saturated fatty acid or other internal breaker, e.g.) maintains a high viscosity prior to gravel placement and eventual breaking (viscosity reduction) of the fluid through action of the breaker. The viscosity of the VES gelled fluid is particularly improved, increased or enhanced, particularly at low shear rates, by the presence of particulate viscosity enhancers. The rate of fluid leak-off during a gravel pack treatment is also significantly reduced by the presence of particulate fluid loss control agents. Further, the viscosity stability of the VES-gelled fluid may be improved or enhanced by the presence of particulate high temperature viscosity stabilizing agents. The viscosity enhancers, viscosity stabilizers, and fluid loss control agents, further improve the ability of the VES-based gravel pack carrier fluid to place gravel in the annulus and/or perforations, and each work by a mechanism that does not inhibit the activity or mechanism of the other. In one non-limiting example, the presence of a high temperature viscosity stabilizer does not inhibit the activity of the internal breakers. In another non-limiting example, the presence and activity of a fluid loss control agent does not inhibit the breaking activity of an internal breaker. After completion of the pumping treatment and shut-in of the well, the internal breaker (e.g. mineral oil and/or fish oil) breaks the viscous gel, i.e. lowers the viscosity of the gravel pack carrier fluid readily and easily in the presence of the viscosity stabilizers, viscosity enhancers, and the like. The internally broken VES fluid is very easy to flow back with the producing fluid, leaving little or no damage to the formation. Very little reservoir pressure and time is required to produce and clean up the broken VES fluid. No reliance on reservoir hydrocarbons is required to contact and clean up the VES gravel pack carrier fluid. Because of their nanometer size and the minute amount used, the particulate viscosity enhancers and stabilizers are also readily producible and will readily clean-up and flowback with the broken VES fluid, leaving little to no particulate damage to the formation.

Although in one non-limiting embodiment, certain materials or components used for fluid loss control agents may also function as viscosity stabilizers and/or viscosity enhancers, in another non-restrictive embodiment, it will be appreciated that the fluid loss control agents used are different from the viscosity stabilizers used, and in turn the viscosity enhancers employed are different from either the fluid loss control agents and viscosity stabilizers employed.

New methods have been discovered to reduce the viscosity of aqueous fluids gelled with viscoelastic surfactants (i.e. surfactants that develop viscosity in aqueous brines, including chloride brines, by formation of rod- or worm-shaped micelle structures). The new methods remove the need or reliance on reservoir hydrocarbons to contact, break, and cleanup the viscoelastic fluid. The improvements will allow relatively very quick breaks, such as within 1 to about 16 hours, compared to using bacteria to break VES which takes at least 48 or more hours, and more typically 4 to 7 days. In another non-limiting embodiment the break occurs within about 1 to about 8 hours; alternatively from about 1 to about 4 hours, and in another non-restrictive version about 1 to about 2 hours. The breaker components herein can be used as an internal breaker, e.g. added to the gel after batch mixing of a VES-gel treatment, or added on-the-fly after continuous mixing of a VES-gel treatment using a liquid additive metering system in one non-limiting embodiment, or the components can be used separately, if needed, as an external breaker solution to remove VES gelled fluids already placed downhole. Internal breakers suitable for the methods and compositions herein include transition metal ion sources, reducing agent sources, chelating agent sources, alkali metal sources, alkaline earth metal sources, saponified fatty acids, mineral oils, hydrogenated polyalphaolefin oils, saturated fatty acids, unsaturated fatty acids and combinations thereof. Bacteria may also be used alone or conjunction with these other internal breakers, although as noted, reducing the viscosity of VES gelled fluids with bacteria is relatively slow. The use of bacteria as a viscosity breaker for VES gelled fluids is described in U.S. Pat. No. 7,052,901 to Baker Hughes, incorporated herein in its entirety by reference.

The internal breakers (e.g. mineral oils, hydrogenated polyalphaolefin oils, saturated fatty acids, polyunsaturated fatty acids, and the like) are not solubilized in the brine, since they are inherently hydrophobic, but rather interact with the VES surfactant worm-like micelle structures initially as dispersed microscopic oil droplets and thus form an oil-in-water type emulsion where the oil droplets are dispersed in the "internal phase" as a "discontinuous phase" of the brine medium/VES fluid which is the "outer phase" or "continuous phase". Laboratory tests have shown that small amounts of unsaturated fatty acids, enough to eventually completely the break VES viscosity, will not spontaneously degrade VES viscosity upon individual association and dispersion within the VES micelles, but will become active to degrade VES viscosity upon activation, such as auto-oxidation of the fatty acids to products that disrupt the elongated, "rod-like" or "worm-like" micelles.

Surprisingly and unexpectedly the method may employ one or more mineral oil (as a non-limiting example of a suitable breaker) as the breaking component. This is surprising because, as previously discussed, the literature teaches that contact of a VES-gelled fluid with hydrocarbons, such as those of the formation in a non-limiting example, essentially instantaneously reduces the viscosity of the gel or "breaks" the fluid. By "essentially instantaneously" is meant less than one-half hour. The rate of viscosity break for a given reservoir temperature by the methods described herein is influenced by type and amount of salts within the mix water (i.e. seawater, KCl, NaBr, CaCl$_2$, CaBr$_2$, NH$_4$Cl and the like), presence of a co-surfactant (i.e. sodium dodecyl sulfate, sodium dodecyl benzene sulfonate, potassium laurate, potassium oleate, sodium lauryl phosphate, and the like), VES type (i.e. amine oxide, quaternary ammonium salt, and the like), VES loading, the amount of breaker (e.g. mineral oil) used, the distillation range of the mineral oil, its kinematic viscosity, the presence of components such as aromatic hydrocarbons, and the like.

It is important to add the lower molecular weight mineral oils after the VES product is added to the aqueous fluid. However, for higher molecular weight mineral oils, types like GLORIA® and HYDROBRITE® 200 from Crompton Corporation, they may be added before, during or after the VES product addition. Mineral oil (also known as liquid petrolatum) is a by-product in the distillation of petroleum to produce gasoline. It is a chemically inert transparent colorless oil composed mainly of linear, branched, and cyclic alkanes (paraffins) of various molecular weights, related to white petrolatum. Mineral oil is produced in very large quantities, and is thus relatively inexpensive. Mineral oil products are typically highly refined, through distillation, hydrogenation, hydrotreating, and other refining processes, to have improved properties, and the type and amount of refining varies from product to product. Highly refined mineral oil is commonly used as a lubricant and a laxative, and with added fragrance is marketed as "baby oil" in the U.S. Most mineral oil products are very inert and non-toxic, and are commonly used as baby oils and within face, body and hand lotions in the cosmetics industry. Other names for mineral oil include, but are not necessarily limited to, paraffin oil, paraffinic oil, lubricating oil, base oil, white mineral oil, and white oil.

In one non-limiting embodiment the mineral oil is at least 99 wt % paraffinic. Because of the relatively low content of aromatic compounds, mineral oil has a better environmental profile than other oils. In general, the more refined and less aromatic the mineral oil, the better. In another non-restrictive version, the mineral oil may have a distillation temperature range from about 160 to about 550° C., alternatively have a lower limit of about 200° C. and independently an upper limit of about 480° C.; and a kinematic viscosity at 40° C. from about 1 to about 250 cSt, alternatively a lower limit of about 1.2 independently to an upper limit of about 125 cSt. Specific examples of suitable mineral oils include, but are not necessarily limited to, BENOL®, CARNATION®, KAYDOL®, SEMTOL®, HYDROBRITE® and the like mineral oils available from Crompton Corporation, ESCAID®, EXXSOL® ISOPAR® and the like mineral oils available from Exxon-Mobil Chemical, and similar products from other mineral oil manufacturers. The ESCAID 110® and Conoco LVT-200® mineral oils have been well known components of oil-based drilling muds and the oil industry has considerable experience with these products, thus making them an attractive choice. The mineral oils from ConocoPhillips Company with their high purity and high volume use within other industries are also an attractive choice.

It has been discovered in breaking VES-gelled fluids prepared in monovalent brines (such as 3% KCl brine) that at temperatures below about 180° F. (82° C.) ESCAID® 110 works well in breaking VES-gelled fluids, and that at or above about 140° F. (60° C.) HYDROBRITE® 200 works well. The use of mineral oils herein is safe, simple and economical. In some cases for reservoir temperatures between about 120° to about 240° F. (about 49° to about 116° C.) a select ratio of two or more mineral oil products, such as 50 wt % ESCAID® 110 to 50 wt % HYDROBRITE® 200 may be used to achieve controlled, fast and complete break of a VES-gelled fluid.

In one non-limiting embodiment these gel-breaking products or breakers work by rearrangement of the VES micelles from rod-shaped or worm-shaped elongated structures to spherical structures. The breaking components described herein may also include the unsaturated fatty acid or polyenoic and monoenoic components of U.S. Patent Application Publication 2006/0211776, Ser. No. 11/373,044 filed Mar. 10, 2006, incorporated herein in its entirety by reference. In one non-limiting embodiment these unsaturated fatty acids (e.g. oleic, linoleic, linolenic, eicosapentaenoic, etc.) may possibly be used alone—in oils they are commonly found in (flax oil, soybean oil, etc), and can be provided as custom fatty acid blends (such as Fish Oil 18:12TG by Bioriginal Food & Science Corp.)—or used together with the mineral oils herein. In another non-limiting embodiment, natural saturated hydrocarbons such as terpenes (e.g. pinene, d-limonene, etc.), saturated fatty acids (e.g. lauric acid, palmitic acid, stearic acid, etc. from plant, fish and/or animal origins) and the like may possibly be used together with or alternatively to the mineral oils herein. In some cases it is preferred that the plant or fish oil be high in polyunsaturated fatty acids, such as flax oil, salmon oil, and the like. The plant and fish oils may be refined, blended and the like to have the desired polyunsaturated fatty acid composition modified for the compositions and methods herein. Other refinery distillates may potentially be used in addition to or alternatively to the mineral oils described herein, as may be hydrocarbon condensation products. Additionally, synthetic mineral oils, such as hydrogenated polyalphaolefins, and other synthetically derived saturated hydrocarbons may be of utility to practice the methods herein.

In one non-limiting embodiment, the breaking or viscosity reduction is triggered or initiated by heat. These mineral, plant, and animal oils will slowly, upon heating, break or reduce the viscosity of the VES gel with the addition of or in the absence of any other viscosity reducing agent. The amount of internal breaker (mineral oil, e.g.), needed to break a VES-gelled fluid may in some cases be temperature dependent, with less needed as the fluid temperature increases. For mineral oil, the kinematic viscosity, molecular weight distribution, and amount of impurities (such as aromatics, olefins, and the like) also appear to influence the rate in which a mineral oil will break a VES-gelled fluid at a given temperature. For unsaturated fatty acid oils the type and amount of unsaturation (i.e. double carbon bonds) appears to be the major influence on the rate at which the fatty acid oil will break the VES-gelled fluid at a given temperature. Once a fluid is completely broken at an elevated temperature and cooled to room temperature a degree of viscosity reheal may occur but in most cases no rehealing is expected. The effective amount of mineral oil, plant oil and/or fish oil ranges from about 0.1 to about 20 gptg based on the total fluid, in another non-limiting embodiment from a lower limit of about 0.5 gptg, where "total fluid" means overall VES gelled fluid with all components of the particular embodiment. Independently the upper limit of the range may be about 12 gptg based on the total fluid. (It will be appreciated that units of gallon per thousand gallons (gptg) are readily converted to SI units of the same value as, e.g. liters per thousand liters, $m^3/1000 m^3$, etc.)

Controlled viscosity reduction rates can be achieved at a temperature of from about 70° F. to about 400° F. (about 21 to about 204° C.), and alternatively at a temperature of from about 100° F. independently to an upper end of the range of about 280° F. (about 38 to about 138° C.), and in another non-limiting embodiment independently up to about 300° F. (149° C.). In one non-limiting embodiment, the fluid designer would craft the fluid system in such a way that the VES gel would break at or near the formation temperature after gavel packing was accomplished.

In another non-limiting example, a combination of internal breakers may have synergistic results, that is, the breaking profile of the fluid over time is improved when two types of internal breakers are used rather only one or the other. The use of mineral oil alone, like the use of metal enhanced polyenoic breaker alone, does not give the rate and degree of viscosity reduction over time as does the combination of mineral oil with metal enhanced polyenoic breaker. By using combinations of internal breakers, both the initial and final break of the VES fluid may be customized, that is, have improved overall breaking performance. In some non-limiting embodiments, one breaker mechanism appears to help speed up the other breaker mechanism. Surprisingly, even with two internal breaker mechanisms present in the VES fluid, the novel pseudo-filter cake with fluid loss control agent may still shows excellent fluid loss control.

It is sometimes difficult to specify with accuracy in advance the amount of the various breaking components that should be added to a particular aqueous fluid gelled with viscoelastic surfactants to sufficiently or fully break the gel, in general. For instance, a number of factors affect this proportion, including but not necessarily limited to, the particular VES used to gel the fluid; the particular breaker used (e.g. mineral, plant, and/or fish oil, unsaturated fatty acid, etc.); the temperature of the fluid; the downhole pressure of the fluid, the starting pH of the fluid; and the complex interaction of these various factors. Nevertheless, in order to give an approximate idea of the proportions of the various breaking components to be used in the methods herein, approximate ranges will be provided. In an alternative, non-limiting embodiment the amount of mineral oil that may be effective herein may range from about 5 to about 25,000 ppm, based on the total amount of the fluid. In another non-restrictive version, the amount of mineral oil may range from a lower end of about 50 independently to an upper end of about 12,000 ppm.

The use of transition metal ion sources as breakers for VES-gelled fluids is more fully described in U.S. Ser. No. 11/145,630 filed Jun. 6, 2005, published as U.S. Patent Application Publication 2006/0041028, incorporated by reference herein in its entirety. Briefly, the transition metal ion source used as an internal breaker may include a transition metal salt or transition metal complex, where the transition metal may be from Groups VA, VIA, VIIA, VIIIA, IB, IIB, IIIB, and IVB of the Periodic Table (previous IUPAC American Group notation). One or more chelating agents and/or one or more reducing agent sources may also be used in conjunction with the transition metal ion sources as breaking agents. In one non-limiting embodiment, the amount of transition metal ion from the transition metal ion source ranges from about 0.01 to about 300 ppm, based on the total fluid.

The use of saponified fatty acids as breakers for VES gelled aqueous fluids as breakers is more fully described in U.S. Ser. No. 11/372,624 filed Mar. 10, 2006, published as U.S. Patent Application Publication 2006/0211775, incorporated by reference herein in its entirety. Briefly, the saponified fatty acids are soap reaction products of a fatty acid with an alkaline compound selected from the group consisting of organic bases, alkali metal bases, alkali earth metal bases, ammonium bases, and combinations thereof. The soap reaction products may be pre-formed prior to addition as an internal breaker, or may be formed in situ. Suitable fatty acids include, but are not limited to those found in plant oils and animal oils. Suitable alkali metal bases, alkali earth metal bases and ammonium bases include, but are not necessarily limited to oxides and hydroxides of cations of the group including Na, K, Cs, Ca, Mg, Ba, Fe, Mn, Cu, Zn, Zr, Mo, V, Co, Al, Sn, $NH_4$, $(CH_3)_4$N, and mixtures thereof. Suitable organic bases include, but are not necessarily limited to, diethanolamine, triethanolamine, choline bases and mixtures thereof. In one non-restrictive embodiment herein, the amount of saponified fatty acid that is effective as a viscosity breaker ranges from about 50 to about 20,000 ppm based on the total viscoelastic surfactant gelled fluid.

The use of the disclosed breaker systems is ideal for controlling viscosity reduction of VES based gravel pack carrier fluids. The breaking system may also be used for breaking fracturing fluids, acidizing or near-wellbore clean-up fluids, and loss circulation pill fluids composed of VES. The breaker system may additionally work for foamed fluid applications (hydraulic fracturing, acidizing, and the like), where $N_2$ or $CO_2$ gas is used for the gas phase. The VES breaking methods herein are a significant improvement in that it gives breaking rates for VES based fluids that the industry is accustomed to with conventional polymer based fluids, such as borate crosslinked guar and linear HEC (hydroxy-ethylcellulose). Potentially more importantly, the use of these internal breaker systems in combination with external downhole breaking conditions should help assure and improve hydrocarbon production compared to prior art that uses only external mechanisms to break the VES fluid for effective and complete VES fluid clean-up after a treatment.

In one non-limiting embodiment, the compositions herein will degrade the gel created by a VES in an aqueous fluid, by disaggregation or rearrangement of the VES micellar structure. However, the inventors do necessarily not want to be limited to any particular mechanism. Also, in another non-restrictive version, the only component present in the VES gelled aqueous fluid that reduces viscosity is one of the internal breakers described herein, or mixtures thereof. That is, a separately introduced external breaker component introduced after the VES-gelled gravel pack carrier fluid is not used (e.g. various clean-up fluids). However, conditions (such as elevated temperature) and already existing chemicals (reservoir hydrocarbons) may be present when and where the internal breakers are included, either intentionally or incidentally.

The viscoelastic surfactant gelled fluids herein can optionally contain at least one viscosity enhancer. The viscosity enhancers herein also aid with fluid loss control. Suitable viscosity enhancers include, but are not limited to, pyroelectric particles, piezoelectric particles, and mixtures thereof. Details about the use of pyroelectric and piezoelectric particles may be found in U.S. Pat. No. 7,544,643, incorporated by reference herein in its entirety. In one non-limiting theory or explanation, when the fluid containing the viscosity enhancers is heated and/or placed under pressure, the particles develop surface charges that associate, link, connect, or relate the VES micelles to one another thereby increasing the viscosity of the fluid. This is somewhat analogous to the way crosslinkers connect various polymer chains, but the way the viscosity enhancers associate the elongated or "worm-like" VES micelles is believed to be completely different.

Suitable viscosity enhancers include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $PbZrTiO_3$, $KNbO_3$, $LiNbO_3$, $LiTaO_3$, $BiFeO_3$, sodium tungstate, $Ba_2NaNb_5O_5$, $Pb_2KNb_5O_{15}$, potassium sodium tartrate, tourmaline, topaz and mixtures thereof. An effective amount of the viscosity enhancer ranges from about 0.1 to about 500 pptg (about 0.012 to about 60 kg/m$^3$) based on the total aqueous viscoelastic treating fluid.

Additionally, the viscoelastic surfactant fluid may optionally also contain high temperature viscosity stabilizers. The viscosity stabilizers used herein would be in most cases for stabilizing or sustaining the VES fluid viscosity at elevated fluid temperatures, such as above 180° F. (82° C.), as contrasted with increasing the fluid viscosity like viscosity enhancers may do. Suitable viscosity stabilizers include, but are not limited to, magnesium oxide, magnesium hydroxide, calcium oxide, calcium hydroxide, sodium hydroxide, and the like. The select viscosity stabilizers may, in one non-limiting embodiment, have an average particle size of 500 nanometers or less, that is, to be preferably small enough to be non-pore plugging and thereby will remain with the VES gravel pack carrier fluid wherever it goes during the gravel packing and during flowback. More information about using these oxides and hydroxides as high temperature viscosity stabilizers may be found in U.S. Pat. No. 7,343,972 and U.S. patent application Ser. No. 11/849,820 filed Sep. 4, 2007, published as U.S. Patent Application Publication No. 2008/0051302, both of which are incorporated by reference herein in their entirety.

The increased viscosity of aqueous fluids gelled with viscoelastic surfactants (VESs) may also be maintained or stabilized by one or more stabilizers that are glycols and/or polyols. These glycols and polyols may stabilize the increased viscosity of VES-gelled fluids effectively over an increased temperature range, such as from about ambient to about 300° F. (about 149° C.). Even though some VESs used to increase the viscosity of aqueous fluids contain a glycol solvent, the use, addition or introduction of the same or different glycol or a polyol, possibly of increased purity, may improve the viscosity stability of the fluid as a whole. Suitable glycols for use with the stabilizing method herein include, but are not necessarily limited to, monoethylene glycol (MEG), diethylene glycol (DEG), triethylene glycol (TEG), tetraethylene glycol (TetraEG), monopropylene glycol (MPG), dipropylene glycol (DPG), and tripropylene glycol (TPG), and where the polyols include, but are not necessarily limited to, polyethylene glycol (PEG), polypropylene glycol (PPG), and glycerol and other sugar alcohols, and mixtures thereof. In the case where the stabilizer is a polyol, the molecular weight of the polyol may range from about 54 to about 370 weight average molecular weight, alternatively where the lower threshold is about 92 weight average molecular weight, and/or where the upper threshold is about 235 weight average molecular weight. Suitable proportions of glycols or polyol stabilizers that may be used, introduced or added, in one non-limiting embodiment range from about 0.1 to 10.0% by volume based on the total of the aqueous fluid. In an alternate, non-restrictive embodiment, the lower end of this proportion range may be about 0.2% bv, and additionally or alternatively the upper end of this proportion range may be about 5.0% bv. Further details about polyol and/or glycol stabilizers may be found in U.S. Patent Application Publication No. US 2007/0244015 A1, incorporated herein in its entirety by reference.

Further details about the additives and components discussed above for gravel pack carrier fluids may be found in U.S. Patent Application Publication No. 2008/0202744 A1 incorporated by reference herein in its entirety.

Any suitable mixing apparatus may be used to formulate the viscoelastic surfactant gelled fluid. In the case of batch mixing, the VES gelling agent, the viscosity enhancer and the aqueous fluid are blended for a period of time. There are select internal breakers (e.g. transitional metal ion source, vegetable, and/or animal oil, etc.) that may be added during batch mixing or on the fly during the treatment. Alternately, other internal breakers are added after batch mixing or on the fly during the treatment (e.g. mineral oil, hydrogenated polyalphaolefin oils, etc.). The VES that is useful herein may be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference in their entirety.

Viscoelastic surfactants improve the treating fluid performance through the use of a polymer-free system. These systems, compared to polymeric based fluids, can offer improved viscosity breaking, higher gravel transport capability, are in many cases more easily recovered after treatment than polymers (particularly with the internal breakers discussed), and are relatively non-damaging to the reservoir with appropriate contact with internal breakers and/or sufficient quantity of reservoir hydrocarbons, such as crude oil and condensate. The systems are also more easily mixed "on the fly" in field operations and do not require numerous co-additives in the fluid system, as do some prior systems.

The viscoelastic surfactants suitable for use herein include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox® APA-T formulation, which should be understood as a dipropylamine oxide since both R' groups are propyl.

Materials sold under U.S. Pat. No. 5,964,295 include CLEAR-FRAC™, which may also comprise greater than 10% of a glycol. One preferred VES is an amine oxide. As noted, a particularly preferred amine oxide is APA-T, sold by Baker Oil Tools as SURFRAQ™ VES, in the context of fracturing fluids. SURFRAQ is a VES liquid product that is 50% APA-T and greater than 40% propylene glycol. These viscoelastic surfactants are capable of gelling aqueous solutions to form a gelled base fluid. The additives of methods described herein are used to prepare a VES system sold by Baker Oil Tools as DIAMOND-FRAQ™. DIAMOND-FRAQ™ with its assured breaking technology overcomes reliance on external reservoir conditions in order to break, as compared with products such as CLEARFRAC™.

The methods and compositions herein also cover commonly known materials as AROMOX® APA-T manufactured by Akzo Nobel and other known viscoelastic surfactant gelling agents common to treatment of subterranean formations.

The amount of VES included in the gravel pack carrier fluid depends on at least two factors. One involves generating enough viscosity to control the rate of fluid leak off into the pores of the reservoir, and the second involves creating a viscosity high enough to suspend the gravel on the trip to the interval during the hydraulic pumping, in the case of these gravel pack carrier fluids. Thus, depending on the application, the VES is added to the aqueous fluid in concentrations ranging from about 0.5 to 25% by volume, alternatively up to about 12 vol % of the total aqueous fluid (from about 5 to 120 gptg). In another non-limiting embodiment, the range for the present formulations is from about 1.0 to about 6.0% by volume VES product. In an alternate, non-restrictive form, the amount of VES ranges from a lower limit of about 2 independently to an upper limit of about 10 volume %.

The viscoelastic surfactant gelled fluids herein may also contain fluid loss control agents, although as noted above, some of the components such as the viscosity enhancers already discussed function as fluid loss control agents at higher concentrations, such as 15 pptg (1.5 $kg/m^3$). More information on these fluid loss control agents may be found in U.S. Pat. No. 7,550,413 incorporated by reference herein in its entirety. Improving or increasing fluid loss may also be accomplished by increasing the concentration or use of the nano-sized particles that enhance viscosity. Increasing the concentration of these particles will eventually be enough to allow the build up of higher fluid viscosity for: 1) reservoir matrix viscosity improvement; and for 2) development of mostly an "external viscous VES fluid layer" on the formation, that is, a pseudo-filter cake (in contrast to a true filter cake that often extends into the formation with potential for damaging the formation). The combination of both can occur, that is, an internal/matrix of the pore-type viscosity fluid loss control and external pseudo-filter cake development. In one non-limiting embodiment, the amount of fluid loss control agent ranges from about 2 to about 200 pptg (about 0.2 to about 24 $kg/m^3$) based on the VES gelled fluid. It may be realized that certain materials, e.g. alkali metals and alkaline earth metals, may serve and function as both "high temperature viscosity stabilizers" and as fluid loss agents within the fluids described herein.

It is expected in one non-limiting embodiment that the fluid loss control agents would be primarily the nano-sized particles discussed above for fluid loss control and viscosity enhancing. Increasing the amount of these agents increases the building of pseudo-filter cake. These particles include, but are not necessarily limited to, the piezo- and pyroelectric particles, optionally in nano-sized form. Coarser or larger-sized transition metal oxide and/or transition metal hydroxides such as MgO may also be used alone or together with the nano-sized particles discussed immediately above. The fluid loss control agents may be added at any time during the mixing and/or blending process.

A value of the compositions and methods herein is that a VES-based gravel pack carrier fluid may be designed to have enhanced breaking characteristics. That is, fluid breaking is no longer solely dependant on external reservoir conditions for viscosity break and is controllable: the rate of viscosity reduction, if complete break is achieved or approached, occurs throughout the reservoir interval, and the amount of reservoir pressure required to displace the VES-based fluid is significantly reduced. Importantly, better clean-up of the VES fluid from the formation and wellbore can be achieved thereby. Better clean-up of the VES directly influences the success of the frac treatment, which is an enhancement of the well's hydrocarbon productivity. VES fluid clean-up limitations and failures of the past can now be overcome or improved by the use of fluid compositions disclosed herein.

In order to practice the methods herein, an aqueous treating fluid, as a non-limiting example, is first prepared by blending a fluid loss control agent, a VES gelling agent, and an internal breaker into an aqueous fluid. The aqueous fluid could be, for example, water, brine, seawater, or mixtures thereof. Any suitable mixing apparatus may be used for this procedure. In one non-limiting embodiment, in the case of batch mixing, the viscosity enhancer, VES gelling agent, and the aqueous fluid are blended for a short period of time sufficient to mix the components together, such as for 15 minutes to 1 hour, and the internal breaker may be added just prior to use. In another non-limiting embodiment all of the fluid loss control agent, VES gelling agent and the internal breaking composition may be added to the aqueous fluid on the fly, during a treatment.

The base fluid can also contain other conventional additives common to the well service industry such as water wetting surfactants, surfactants other than viscoelastic surfactants, non-emulsifiers, scale inhibitors, and the like. As noted herein, the base fluid can also contain other non-conventional additives which can contribute to the breaking action of the VES fluid, and which are added for that purpose in one non-restrictive embodiment.

Any or all of the above internal breakers (e.g. mineral vegetable, and animal oils) may be provided in an extended release form such as encapsulation by polymer or otherwise, pelletization with binder compounds, absorbed or some other method of layering on a microscopic particle or porous substrate, and/or a combination thereof. Specifically, the internal breakers (in non-restrictive embodiments mineral, plant and/or fish oils) may be micro- and/or macro-encapsulated to permit slow or timed release thereof. In non-limiting examples, the coating material may slowly dissolve or be removed by any conventional mechanism, or the coating could have very small holes or perforations therein for the mineral oils within to diffuse through slowly. For instance, a mixture of fish gelatin and gum acacia encapsulation coating available from ISP Hallcrest, specifically CAPTIVATES® liquid encapsulation technology, can be used to encapsulate the internal breakers herein (e.g. mineral, plant, fish, synthetic and other saturated oils). Also, polymer encapsulation coatings such as used in fertilizer technology available from Scotts Company, specifically POLY-S® product coating technology, or polymer encapsulation coating technology from Fritz Industries could possibly be adapted to the methods herein. The mineral oils could also be absorbed onto zeolites, such as Zeolite A, Zeolite 13X, Zeolite DB-2 (available from PQ Corporation, Valley Forge, Pa.) or Zeolites Na-SKS5, Na-SKS6, Na-SKS7, Na-SKS9, Na-SKS10, and Na-SKS13, (available from Hoechst Aktiengesellschaft, now an affiliate of Aventis S.A.), and other porous solid substrates such as MICROSPONGE™ (available from Advanced Polymer Systems, Redwood, Calif.) and cationic exchange materials such as bentonite clay or placed within microscopic particles such as carbon nanotubes or buckminster fullerenes. Further, the mineral oils may be both absorbed into and onto porous or other substrates and then encapsulated or coated, as described above.

In a typical gravel pack operation, the gravel pack carrier fluid is pumped at a rate sufficient to deliver and place the gravel into the annulus adjacent the interval, as well as into the perforation tunnels. A typical gravel packing treatment would be conducted by mixing a 10.0 to 60.0 gallon/1000 gal water (60.0 liters/1000 liters) amine oxide VES, such as SUR-FRAQ, in a 2% (w/v) (166 lb/1000 gal, 19.9 kg/m$^3$) KCl solution at a pH ranging from about 6.0 to about 9.0. The breaking component may be added during the VES addition or more typically after the VES addition to the water or brine using appropriate mixing and metering equipment, or if needed in a separate step after the gravel packing operation is complete, or combinations of these procedures.

Gravel is typically added to the base fluid after the addition of the VES in the preparation of a gravel pack carrier fluid. Gravel may include, but is not limited to, for instance, quartz sand grains, ceramic beads, plastic beads, and the like. In one non-limiting embodiment, the size of the gravel may range from about 70 mesh (210 micron) to about 10 mesh (2000 micron). Gravel is normally used in concentrations between about 0.5 to 10 pounds per gallon (60-1200 kg/m$^3$) of gravel pack carrier fluid composition, but higher or lower concentrations can be used as the gravel pack design required. The base fluid can also contain other conventional additives common to the well service industry such as water wetting surfactants, non-emulsifiers and the like. As noted herein, the base fluid can also contain other non-conventional additives which can contribute to the breaking action of the VES fluid, and which are added for that purpose in one non-restrictive embodiment.

As may be seen, the method of gravel packing a relatively long horizontal interval as described herein provides a generally uniform and/or homogeneous gravel pack. This may be done with a relatively low volume of fluid and reduced fluid loss and potential for damage to the formation. Besides changing concentrations of salt, other variables, including, but not necessarily limited to, VES concentration, fluid loss control agent concentration and type, concentration of internal breaker(s), and combinations of these, can also affect the leakoff characteristics of the fluid systems and may be considered in optimizing fluid efficiency.

In the foregoing specification, the invention has been described with reference to specific embodiments thereof, and has been demonstrated as effective in providing methods for gravel packing long horizontal intervals in subterranean formations, particularly where the fluid has an internal breaker mechanism. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of viscoelastic surfactants, internal breakers, viscosity enhancers, fluid loss control agents, viscosity stabilizers, gravel and other components falling within the claimed parameters, but not specifically identified or tried in a particular composition or fluid, are anticipated to be within the scope of this invention. Further, it is expected that the components and proportions of the gravel pack carrier fluids may change somewhat from one fluid to another and still accomplish the stated purposes and goals of the methods described herein.

The words "comprising" and "comprises" as used throughout the claims is interpreted "including but not limited to".

The present invention may suitably comprise, consist or consist essentially of the elements disclosed and may be practiced in the absence of an element not disclosed.

What is claimed is:

1. A method of gravel packing an interval in a wellbore comprising:
    drilling a wellbore into a subterranean formation to create an interval in the formation;
    introducing a pipe into the wellbore adjacent the interval thereby forming an annulus between the pipe and a wellbore wall;

introducing a first gravel pack carrier fluid into a first section of the annulus, where the first gravel pack carrier fluid comprises:
  water having a first salt concentration;
  at least one viscoelastic surfactant (VES) in an amount effective to increase the viscosity of the water;
  at least one internal breaker;
  at least one fluid loss control agent; and
  gravel; and
introducing a second gravel pack carrier fluid into a second section of the annulus adjacent the first section of the annulus, where the second gravel pack carrier fluid is identical to the first gravel pack carrier fluid except that it has a second salt concentration different from the first salt concentration.

2. The method of claim 1 where the interval is generally horizontal and comprises a heel and a toe,
  where the first section of the annulus is adjacent the heel; and
  where the first salt concentration is greater than the second salt concentration.

3. The method of claim 1 where the interval is generally horizontal and comprises a heel and a toe,
  where the first section of the annulus is adjacent the toe; and
  where the first salt concentration is greater than the second salt concentration.

4. The method of claim 1 further comprising introducing a third gravel pack carrier fluid into a third section of the annulus adjacent and proximate to the second section of the annulus and distal to the first section of the annulus, where the second gravel pack carrier fluid is identical to the first and second gravel pack carrier fluids except that it has a third salt concentration different from the first salt concentration and the second salt concentration where the first salt concentration is greater than the second salt concentration which is in turn greater than the third salt concentration.

5. The method of claim 1 where the interval further comprises perforation tunnels.

6. The method of claim 1 where the internal breaker is selected from the group consisting of bacteria, transition metal ion sources, saponified fatty acids, mineral oils, hydrogenated polyalphaolefin oils, saturated fatty acids, unsaturated fatty acids, and combinations thereof.

7. The method of claim 6 where:
  when the internal breaker is bacteria, the amount of bacteria ranges from about 0.01 to about 20.0 vol %;
  when the internal breaker is a transition metal ion source, the amount of transition metal ion from the transition metal ion source ranges from about 0.01 to about 300 ppm;
  when the internal breaker is a saponified fatty acid, the amount of saponified fatty acid ranges from about 50 to about 20,000 ppm; and
  when the internal breaker is selected from the group consisting of mineral oils, hydrogenated polyalphaolefin oils, saturated fatty acids, unsaturated fatty acids and combinations thereof, the amount of internal breaker ranges from about 0.1 to about 20 gptg;
all based on the VES gelled gravel pack carrier fluid.

8. The method of claim 1 where the VES gelled treating fluid composition further comprises at least one VES stabilizer selected from the group consisting of alkali metal oxides, alkali metal hydroxides, alkali earth metal oxides, alkali earth metal hydroxides, transition metal oxides, transition metal hydroxides, glycols, polyols, and combinations thereof.

9. The method of claim 1 further comprising placing a screen between the pipe and the wellbore in the interval.

10. The method of claim 1 where the interval is at least 100 feet (30 m) long.

11. The method of claim 1 where the at least one fluid loss control agent is selected from the group consisting of alkali earth metal oxides, alkali earth metal hydroxides, transition metal oxides, transition metal hydroxides, and mixtures thereof.

12. The method of claim 11 where an amount of the fluid loss control agent ranges from about 2 to about 200 pptg (about 0.2 to about 24 kg/m$^3$) based on the VES gelled gravel pack carrier fluid.

13. The method of claim 1 where the VES gelled treating fluid composition further comprises at least one viscosity enhancer selected from the group consisting of pyroelectric particles, piezoelectric particles, and mixtures thereof.

14. A method of gravel packing an interval in a wellbore comprising:
  drilling a wellbore into a subterranean formation to create a generally horizontal interval in the formation, where the interval comprises a heel and a toe;
  introducing a pipe into the wellbore adjacent the interval, where an annulus is present between the pipe and a wellbore wall;
  introducing a first gravel pack carrier fluid into a first section of the annulus, where the first gravel pack carrier fluid comprises:
    water having a first salt concentration;
    at least one viscoelastic surfactant (VES) in an amount effective to increase the viscosity of the water;
    at least one internal breaker;
    at least one fluid loss control agent; and
    gravel;
  introducing a second gravel pack carrier fluid into a second section of the annulus adjacent the first section of the annulus, where the second gravel pack carrier fluid is identical to the first gravel pack carrier fluid except that it has a second salt concentration different from the first salt concentration;
the method further comprising conditions selected from the group consisting of:
  (1) where the first section of the annulus is adjacent the heel; and
    where the first salt concentration is greater than the second salt concentration; and
  (2) where the first section of the annulus is adjacent the toe; and
    where the first salt concentration is greater than the second salt concentration.

15. The method of claim 14 further comprising introducing a third gravel pack carrier fluid into a third section of the annulus adjacent and proximate to the second section of the annulus and distal to the first section of the annulus, where the second gravel pack carrier fluid is identical to the first and second gravel pack carrier fluids except that it has a third salt concentration different from the first salt concentration and the second salt concentration where the first salt concentration is greater than the second salt concentration which is in turn greater than the third salt concentration.

16. The method of claim 14 where the interval further comprises perforation tunnels.

17. The method of claim 14 further comprising placing a screen between the pipe and the wellbore in the interval.

18. A method of gravel packing a horizontal interval in a wellbore comprising:
 drilling a wellbore into a subterranean formation to create a horizontal interval in the formation, where the interval comprises a heel and a toe;
 introducing a pipe into the wellbore adjacent the interval, where an annulus is present between the pipe and a wellbore wall;
 introducing a first gravel pack carrier fluid into a first section of the annulus, where the first gravel pack carrier fluid comprises:
  water having a first inorganic salt concentration;
  at least one viscoelastic surfactant (VES) in an amount effective to increase the viscosity of the water;
  at least one internal breaker;
  at least one fluid loss control agent; and
  gravel;
 introducing a second gravel pack carrier fluid into a second section of the annulus adjacent the first section of the annulus, where the second gravel pack carrier fluid is identical to the first gravel pack carrier fluid except that it has a second inorganic salt concentration different from the first inorganic salt concentration;
 introducing a third gravel pack carrier fluid into a third section of the annulus adjacent the second section of the annulus, where the third gravel pack carrier fluid is identical to the first and second gravel pack carrier fluids except that it has a third inorganic salt concentration different from the first inorganic salt concentration and the second inorganic salt concentration where the first inorganic salt concentration is greater than the second inorganic salt concentration which is in turn greater than the third inorganic salt concentration.

19. The method of claim 18 where the first section of the annulus is adjacent the heel.

20. The method of claim 18 where the first section of the annulus is adjacent the toe.

* * * * *